US008408559B1

(12) United States Patent
Lee et al.

(10) Patent No.: US 8,408,559 B1
(45) Date of Patent: Apr. 2, 2013

(54) ACTIVE GEOMETRY CONTROL SUSPENSION SYSTEM

(75) Inventors: Un Koo Lee, Seoul (KR); Sung Bae Jang, Suwon-si (KR); Pil Young Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/586,262

(22) Filed: Aug. 15, 2012

(30) Foreign Application Priority Data

Dec. 12, 2011 (KR) ........................ 10-2011-0133117

(51) Int. Cl.
*B60G 17/016* (2006.01)
(52) U.S. Cl. ................... 280/5.508; 280/5.52; 280/6.16; 280/86.757
(58) Field of Classification Search ............... 280/5.508, 280/5.511, 5.506, 5.5, 5.52, 6.16, 6.159, 280/86.75, 86.751, 86.757
See application file for complete search history.

(56) References Cited

U.S. PATENT DOCUMENTS 7,766,344 B2 * 8/2010 Buma ........................ 280/5.511
8,302,973 B2 * 11/2012 Lee et al. ..................... 280/5.52
2001/0054801 A1 * 12/2001 Perello et al. ................ 280/5.52
2011/0148053 A1 * 6/2011 Motebennur et al. ........ 280/6.16

FOREIGN PATENT DOCUMENTS

| JP | 10-258627 A | 9/1998 |
| JP | 3905243 B2 | 1/2007 |
| JP | 2010-3323 A | 1/2010 |
| KR | 10-2009-0075742 A | 7/2009 |

* cited by examiner

*Primary Examiner* — Drew Brown
(74) *Attorney, Agent, or Firm* — Morgan, Lewis & Bockius LLP

(57) ABSTRACT

An active geometry control suspension system may include an active roll control unit having a guide rail formed along a predetermined distance in a front-rear direction from a rail seat inserted down from above a lower arm, sliders slidably fitting in the guide rail, a stabilizer link with one end pivotally coupled to the sliders, a pushrod with one end pivotally connected to the sliders, and an actuator having an operation bar, one end of which may be pivotally connected to the other end of the pushrod, the operating bar operating forward or backward, wherein the one end of the stabilizer link and the one end of the pushrod may be connected to the sliders through a double ball joint, and the other end of the pushrod and the one end of the operation bar may be connected through a ball joint.

9 Claims, 9 Drawing Sheets

ACTIVE GEOMETRY CONTROL SUSPENSION SYSTEM

CROSS-REFERENCE TO RELATED APPLICATION

The present application claims priority to Korean Patent Application No. 10-2011-0133117 filed in the Korean Intellectual Property Office on Dec. 12, 2011, the entire contents of which is incorporated herein for all purposes by this reference.

BACKGROUND OF THE INVENTION

1. Field of the Invention

The present invention relates to an active geometry control suspension system of a vehicle, and more particularly, to an active geometry control suspension system that can minimize load applied to an actuator by minimizing offset of a load input portion and a load output portion of the actuator.

2. Description of Related Art

In general, a suspension system of a vehicle is a device that prevents damage to the vehicle body or freight and improves ride comfort by connecting the vehicle shaft with the vehicle body such that vibration or shock applied from the road surface to the vehicle shaft is not directly transmitted to the vehicle body while the vehicle travels.

The suspension system includes a chassis spring that alleviates shock from the road surface, a shock absorber that improves ride comfort by attenuating free oscillation of the chassis spring, and a stabilizer bar that suppresses rolling of a vehicle.

Both sides of a straight portion of the stabilizer bar are fixed to the vehicle body and both ends are fixed to a lower arm or a strut bar through a stabilizer link.

Accordingly, the stabilizer bar does not operate when the left and right wheels simultaneously move up/down, but is distorted when the left and right wheels move up/down relative to each other, thereby performing an anti-roll function that suppresses roll of the vehicle, using an elastic distortion force.

That is, the stabilizer bar is distorted and stabilizes the position of a vehicle body by using the elastic distortion force, when the vehicle turns and the outer side of the vehicle body while turning becomes inclined due to centrifugal force, or a relative phase difference is generated between the left and right wheels due to a bump or a rebound while the vehicle travels.

However, the stabilizer bar does not sufficiently ensure stability in turning under various conditions by using only the elastic distortion force thereof because the rigidity value is constant. Therefore, an active roll control unit that can perform active roll control by connecting an actuator implemented by a hydraulic cylinder, a motor, or the like to the front end of the stabilizer bar has recently been developed and applied.

The active roll control unit has a mechanism that changes the connection length between a lower arm and one end of a stabilizer bar and changes distortion rigidity of the stabilizer bar by changing the position of a connection point with an actuator, which is implemented by a hydraulic cylinder or a motor, at a connecting portion of a stabilizer link connecting the lower arm with one end of the stabilizer bar.

Further, members are connected to the connecting portion by a ball joint, such that a rotation degree of freedom within a predetermined range.

FIG. 1 is a partially cut-away perspective view of an active roll control unit according to a first exemplary embodiment of the related art.

Referring to FIG. 1, an active roll control unit according to the first exemplary embodiment of the related art includes an actuator 100, a screw shaft 102, a screw slider 104, a ball joint 106, and a stabilizer link 108.

The actuator 100 is a motor and disposed under a lower ram 110 and the screw slider 104 supported by a guide rail 112 fixed to the lower arm 110 fits on the screw shaft 102, which is a rotary shaft of the actuator 100.

The ball joint 106 is formed above the screw slider 104 and connected with the lower end of the stabilizer link 108.

Therefore, when the actuator 100 operates, the screw slider 104 moves the lower end of the stabilizer link 108 while moving left or right in accordance with the rotational direction of the screw shaft 102, such that the connection length between one end of the stabilizer bar and the lower arm 110 changes.

However, in the configuration described above, offset (OS) is generated between the screw shaft 102 and the ball joint 106, such that a moment is generated and operation load applied to the actuator 100 increases.

FIG. 2 is a partially cut-away perspective view of an active roll control unit according to a second exemplary embodiment of the related art.

Referring to FIG. 2, an active roll control unit according to the second exemplary embodiment of the related art includes sliders 120, a ball joint 122, a stabilizer link 124, and an actuator 126.

The sliders 120 fit on guide rails 130 disposed longitudinally under a lower arm 128, to be movable left and right.

The ball joint 122 is integrally formed with the sliders 120 and connected with the lower end of the stabilizer link 124.

The actuator 126 is disposed behind the stabilizer link 124 and the screw shaft 132 that is a rotary shaft is fastened to a pushrod 134 connected to the lower portion from the middle portion of the stabilizer link 124.

Accordingly, when the actuator 126 operates, the pushrod 134 pushes or pulls the stabilizer link 124 while moving in accordance with the rotational direction of the screw shaft 132, thereby changing the connection length between the lower arm 128 and one end of the stabilizer bar.

In the configuration described above, however, although it is possible absorb oscillation in three directions while mounting the actuator 106 on the vehicle body, as offset (OS) is generated between the portion of the pushrod 134 and the sliding portion, a moment is generated and operation load applied to the actuator 126 increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active geometry control suspension system having advantages of being able to reduce load applied to an actuator by minimizing offset at a load input portion and a load output portion of the actuator.

Further, various aspects of the present invention are directed to providing an active geometry control suspension system having advantages of being able to absorb displacement and oscillation generated when a lower arm, a stabilizer link, and a pushrod bump or rebound.

In an aspect of the present invention, an active geometry control suspension system may include an active roll control unit having a guide rail formed along a predetermined distance in a front-rear direction from a rail seat inserted down from above a lower arm, sliders slidably fitting in the guide rail, a stabilizer link with one end pivotally coupled to the sliders, a pushrod with one end pivotally connected to the sliders, and an actuator having an operation bar, one end of which is pivotally connected to the other end of the pushrod, the operating bar operating forward or backward, wherein the one end of the stabilizer link and the one end of the pushrod are connected to the sliders through a double ball joint, and the other end of the pushrod and the one end of the operation bar are connected through a ball joint.

The double ball joint is configured such that the stabilizer link and the pushrod rotate and make angular displacement within a predetermined range.

The double ball joint is configured by pivotally fitting a second hinge shaft on a first hinge shaft connected between the sliders, wherein the one end of the pushrod and the one end of the stabilizer link are coupled to the second hinge shaft in a ball joint type.

The double ball joint may include the first hinge shaft having a first spherical ball formed on an outer circumference in a middle portion of the first hinge shaft, the second hinge shaft having cylindrical members and including a first ball race mounted on an inner surface of the second hinge shaft, wherein the first ball race is slidably fitted on an outer circumference of the first spherical ball, a second spherical ball coupled to an outer circumference in a middle portion of the second hinge shaft, and a second ball race fitting on an outer surface of the second spherical ball.

The second ball race is integrally formed to the one end of the stabilizer link.

The second hinge shaft is formed by fitting a pair of cylindrical members together.

Each of the cylindrical members may have a circumferential step protruding toward the first hinge shaft and the first ball race is mounted between each circumstantial step on an inner circumference of the cylindrical members.

The second spherical ball is supported by yokes formed the one end of the pushrod, the yokes being positioned at both lateral sides of the second spherical ball.

The pushrod and the operation bar are connected in the ball joint by combining a ball, which is formed on an outer circumference in the center of a hinge shaft fixed to yokes formed at the other end of the pushrod, with a ball race mounted on the ball between the one end of the operation bar and the other end of the push rod.

According to exemplary embodiments of the present invention, since the stabilizer link and the pushrod are connected to the sliders by the double ball joint, it is possible to minimize offset at a load input portion and a load output portion of the actuator and to reduce load applied to the actuator.

That is, offset (OS) is not generated between the portion of the pushrod and the sliding portion, such that operation load on the actuator due to a moment is minimized.

Further, it is possible to absorb oscillation in three directions due to displacement generated when the lower arm, the stabilizer link, and the pushrod bump or rebound.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
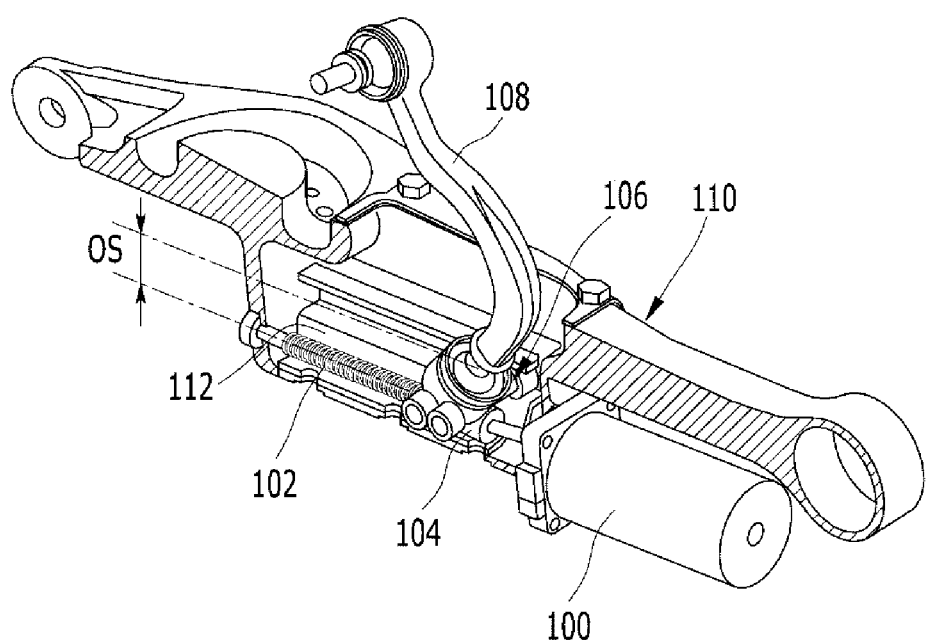
FIG. 1 is a partially cut-away perspective view of an active roll control unit that is applied to an active geometry control suspension system according to a first exemplary embodiment of the related art.
Figure 2:
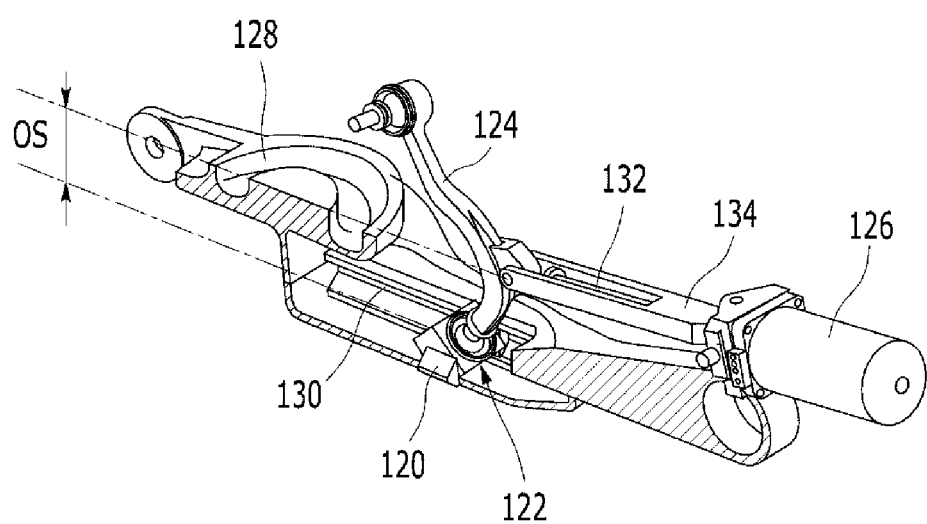
FIG. 2 is a partially cut-away perspective view of an active roll control unit that is applied to an active geometry control suspension system according to a second exemplary embodiment of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention of the present invention will be described with reference to the accompanying drawings.

However, the drawings and description are to be regarded as illustrative in nature and not restrictive. Like reference numerals designate like elements throughout the specification.

The terms "first", "second" etc. in the following description is for discriminating the configurations because the names are the same and the present invention is not limited to the order.

Figure 3:
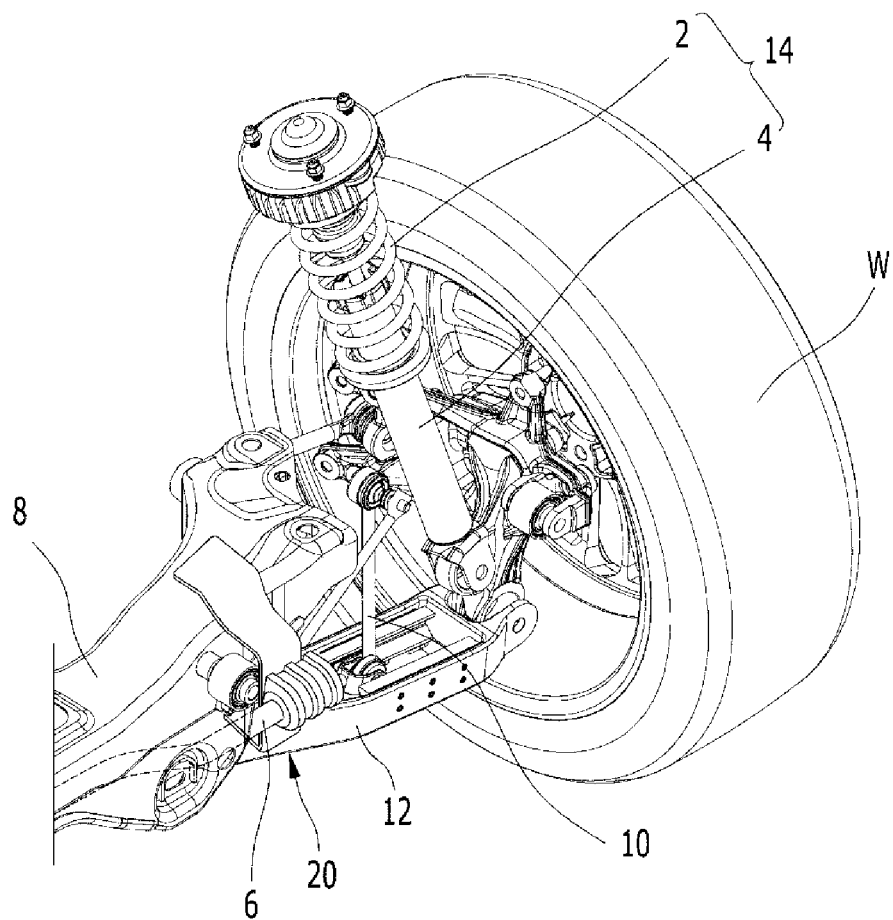
FIG. 3 is a perspective view of an active geometry control suspension system according to an exemplary embodiment of the present invention.

FIG. 3 is a perspective view of an active geometry control suspension system according to an exemplary embodiment of the present invention.

Referring to FIG. 3, a common suspension system includes a chassis spring 2 that alleviate shock from a road surface, a shock absorber 4 improving ride comfort by attenuating free oscillations of the chassis spring 2, and a stabilizer bar 6 suppressing roll of a vehicle.

Both sides of a straight portion of the stabilizer bar 6 are fixed to the vehicle body or a subframe 8 and both ends are fixed to a lower arm 12 or a strut bar 14 through a stabilizer link 10.

Accordingly, the stabilizer bar 6 does not operate when the left and right wheels W simultaneously move up/down, but is distorted when the left and right wheels W move up/down relatively to each other, thereby performing an anti-roll function that suppresses roll of the vehicle body, using an elastic distortion force.

Further, the stabilizer bar 6 does not sufficiently ensure stability in turning under various conditions by using only the elastic distortion force thereof because the rigidity value is constant, such that an active roll control unit 20 that allows active roll control of the front end of the stabilizer bar 6 has recently been developed and applied.

The active roll control unit 20 is disposed between the lower arm 12 and a connecting portion of the stabilizer link 10.

Figure 4:
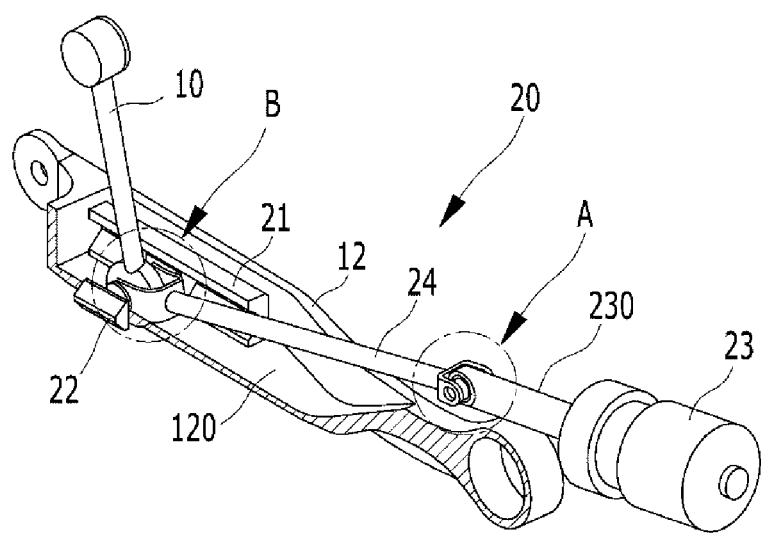
FIG. 4 is a partially cut-away perspective view of an active roll control unit that is applied to an active geometry control suspension system according to an exemplary embodiment of the present invention.

FIG. 4 is a partially cut-away perspective view of an active roll control unit that is applied to an active geometry control suspension system according to an exemplary embodiment of the present invention.

Referring to FIG. 4, an active roll control unit 20 includes a stabilizer link 10, guide rails 21, sliders 22, an actuator 23, and a pushrod 24.

The stabilizer link 10 is a connecting member that connects both ends of the stabilizer bar 6 having both sides of the straight portion fixed to the vehicle body or the subframe 8 with the lower arm 12.

The stabilizer link 10 is connected with the stabilizer bar 6 through a common ball joint.

The guide rails 21 are disposed in the vehicle width direction at a predetermined distance in the front-rear direction from a rail seat 120 inserted down from above the lower arm 12.

The sliders 22 slidably fit in the guide rails 21 and move left and right along the guide rails 21 when a force is applied.

Further, the guide rails 21 and the sliders 22 have a recession and a protrusion corresponding each other, respectively, and are in surface contact with each other.

The recessions and the protrusions of the guide rail 21 and the slider 22 may not be limited in shape, as long as the slider 22 can slide without flowing.

The actuator 23 is disposed at the vehicle body and makes an operation bar 230 operate forward/backward in the vehicle width direction, if necessary.

For this purpose, the actuator 23 may be an electric actuator, a linear motor, or a hydraulic cylinder that can make the operation bar 230 operate forward/backward.

The pushrod 24 is disposed between the sliders 22 and the operation bar 230 and moves the sliders 22 to the left and right while operating with the operation bar 230.

Therefore, when a vehicle turns, a controller operates the actuator 23 in response to signals outputted from an acceleration sensor, a vehicle height sensor, and a steering sensor.

Accordingly, the operation bar 230 of the actuator 23 moves the sliders 22 to the left and right while operating forward/rearward, thereby changing the connection length between the stabilizer bar 6 and the lower arm 12.

As described above, as the connection length between the stabilizer bar 6 and the lower arm 12 changes, the rigidity value of the stabilizer bar 6 changes and roll of the vehicle is actively controlled.

Figure 5:
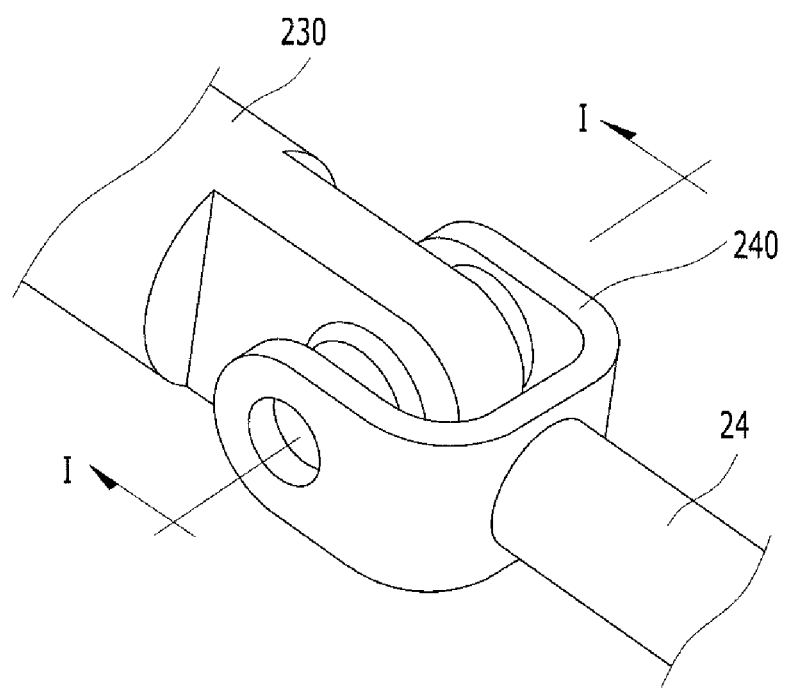
FIG. 5 is an enlarged perspective view of the portion A of FIG. 4.
Figure 6:
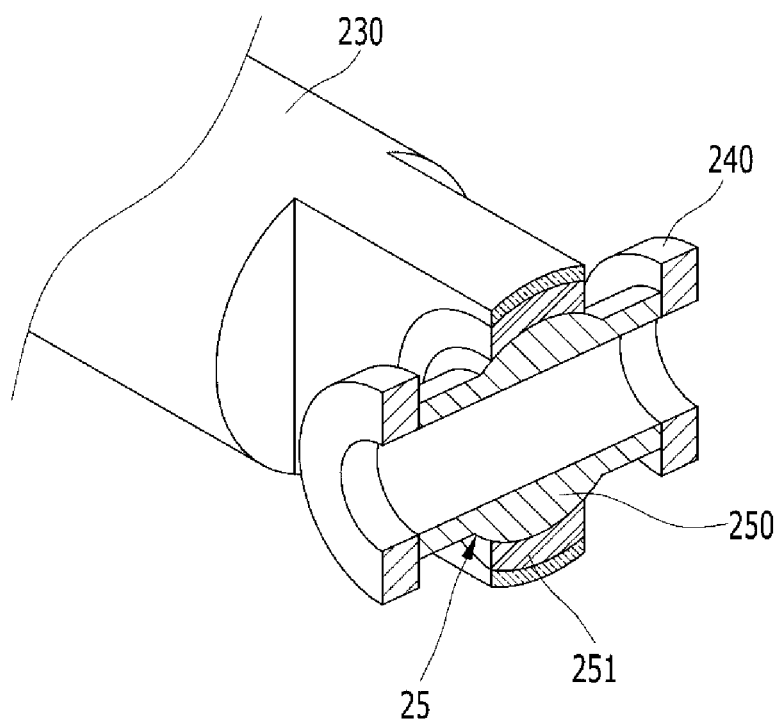
FIG. 6 is a cut perspective view taken along line I-I of FIG. 5.

FIG. 5 is an enlarged perspective view of the connection portion between the operation bar 230 and the pushrod 24, that is, the portion A of FIG. 4 and FIG. 6 is a cut perspective view taken along line I-I of FIG. 5.

Referring to FIGS. 5 and 6, the operation bar 230 and the pushrod 24 are connected through a hinge shaft 25.

Further, the pushrod 24 is fastened by a ball joint to have a degree of freedom in rotation and angular displacement within a predetermined range.

That is, the hinge shaft 25 is a ball stud shaft with a spherical ball 250 at the middle portion and both ends are coupled to yokes 240.

Further, the ball 250 fits in a ball race 251 formed at an end of the operation bar 230, thereby implementing ball joint coupling.

The pushrod 24 is allowed to rotate about the hinge shaft 25 and angular displacement within a predetermined range is allowed by the configuration.

Figure 7:
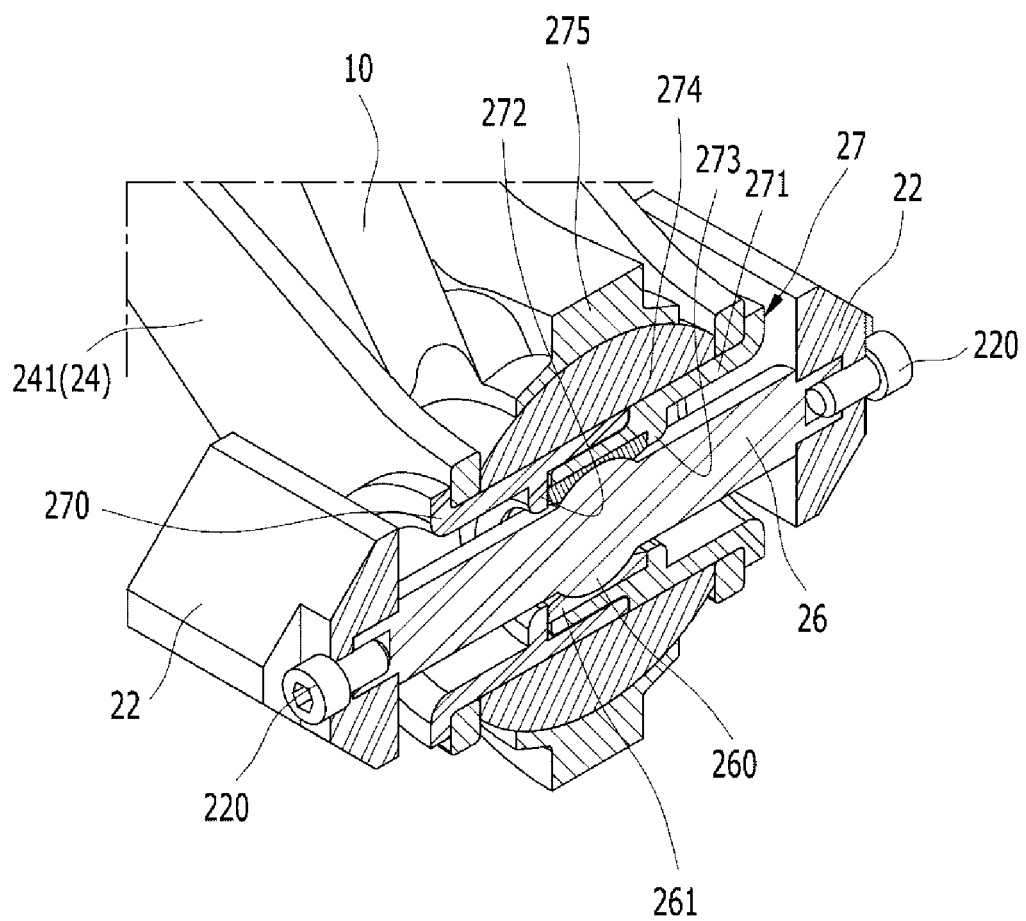
FIG. 7 is a partially cut-away perspective view of the portion B of FIG. 6.
Figure 8:
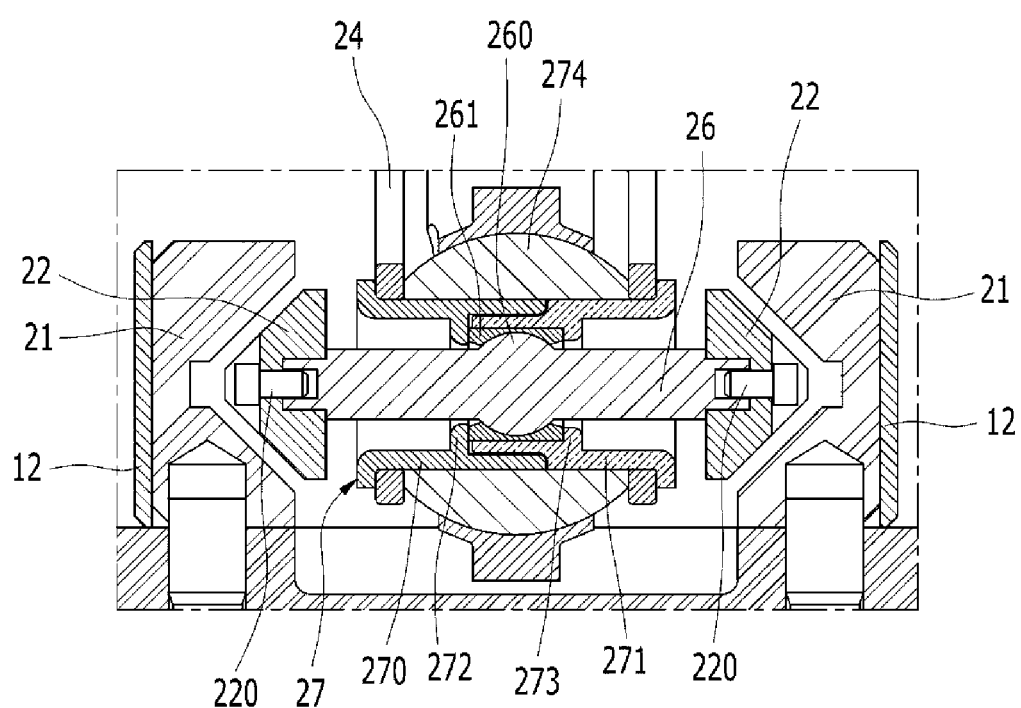
FIG. 8 is a partially enlarged cross-sectional view of FIG. 7.
Figure 9:
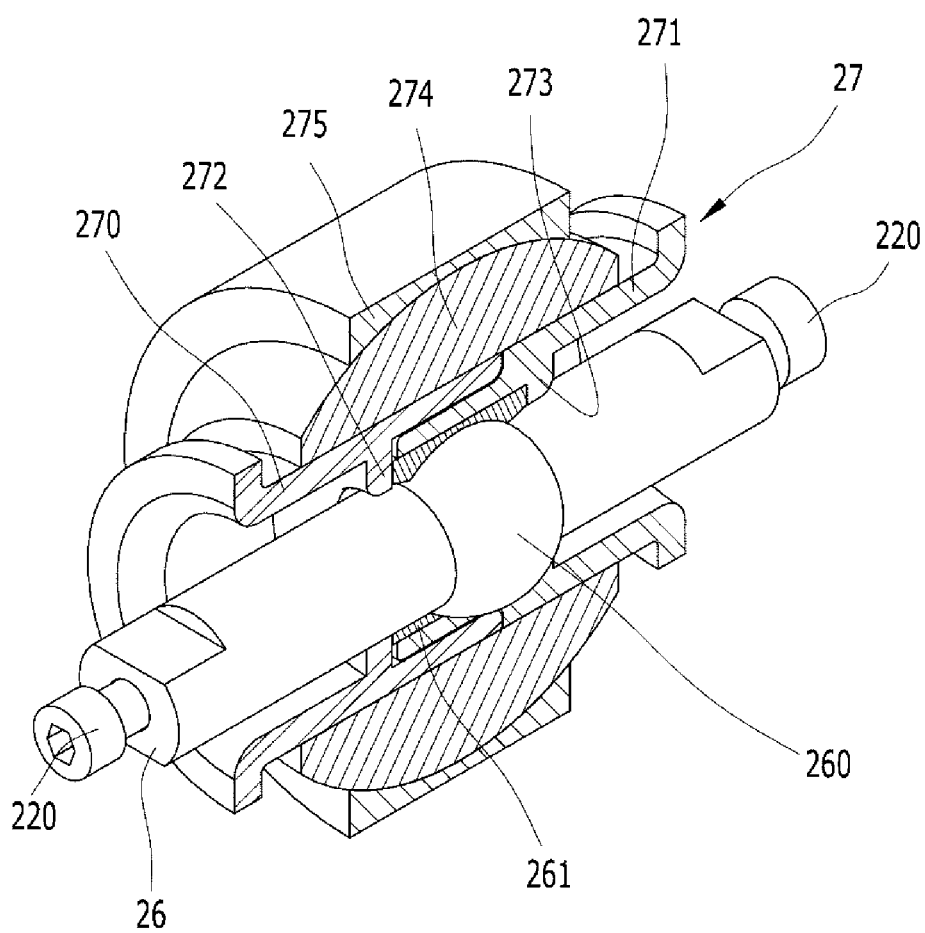
FIG. 9 is a partially enlarged perspective view of FIG. 8.

FIG. 7 is a partially cut-away perspective view of the portion B of FIG. 4, FIG. 8 is a partially enlarged cross-sectional view of FIG. 7, and FIG. 9 is a partially enlarged perspective view of FIG. 8.

Referring to FIGS. 7 to 9, the stabilizer link 10 and the pushrod 24 are coupled through a double ball joint and the sliders 22 slidably fitting in the guide rails 21.

That is, the pushrod 24 is coupled to the second hinge shaft 27 rotatably mounted to a first hinge shaft 26 with both ends fitting in the sliders 22 in a ball joint type and the stabilizer link 10 is coupled to the second hinge shaft 27, which fitting on the first hinge shaft 26 in a ball joint type, in a ball joint type.

The first hinge shaft 26 is a ball stud shaft with a first spherical ball 260 formed outward at the middle portion and a second hinge shaft 27 including a first ball race 261, which fits on the first spherical ball 260, on the inner circumference of the center portion fits on the first hinge shaft 26.

The second hinge shaft 27 includes a pair of cylindrical members 270 and 271, which are combined by fitting and make one cylindrical member.

Further, circumferential steps 272 and 273 that firmly fix both sides of the first ball race 261 are formed on the inner circumferences of the coupled portions of the cylindrical members 270 and 271, and the yokes 241 of the pushrod 24 fit on both ends.

Therefore, the pushrod 24 is coupled to the first hinge shaft 26 through the second hinge shaft 27 in a ball joint type and has a degree of freedom in rotation and angular displacement within a predetermined range.

Further, the a second spherical ball 274, which are made of a different material and combined, is formed on the outer side of the middle portion of the second hinge shaft 27 and a second ball race 275, which is integrally formed at the end of the stabilizer link 10 or separately manufactured and combined, fits on the second spherical ball 274.

The second spherical ball 274 is firmly fixed without flowing left/right by the yokes 241 of the pushrod 24 at both sides, in the configuration described above.

Accordingly, the stabilizer link 10 is coupled to the second hinge shaft 27 in a ball joint type and has a degree of freedom in rotation and angular displacement within a predetermined range.

Further, the sliders 22 disposed at both ends of the first hinge shaft 26 are fastened by fixing bolts 220 to be slidable on the guide rails 21.

As described above, according to an exemplary embodiment of the present invention, the stabilizer link 10 and the pushrod 24 are connected to the sliders 22 by a double ball joint, which is one assembly, such that the offset generated between the sliding position and the position where an operational force due to the pushrod is exerted is minimized, and thus operation load of the actuator 23 can be reduced.

Further, displacement and oscillation geometrically generated by bumping or rebounding can be absorbed by the double ball joint.

Further, the double ball joint described above is not applied only to an active geometry control suspension system and may be applied to all of configurations in which two moving members (stabilizer link and pushrod) hinged to a straight reciprocating body (slider mechanism) have rotation and angular displacement within a predetermined range.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active geometry control suspension system comprising:
   an active roll control unit including:
      a guide rail formed along a predetermined distance in a front-rear direction from a rail seat inserted down from above a lower arm;
      sliders slidably fitting in the guide rail;
      a stabilizer link with one end pivotally coupled to the sliders;
      a pushrod with one end pivotally connected to the sliders; and
      an actuator having an operation bar, one end of which is pivotally connected to the other end of the pushrod, the operating bar operating forward or backward,
   wherein the one end of the stabilizer link and the one end of the pushrod are connected to the sliders through a double ball joint, and the other end of the pushrod and the one end of the operation bar are connected through a ball joint.

2. The system of claim 1, wherein the double ball joint is configured such that the stabilizer link and the pushrod rotate and make angular displacement within a predetermined range.

3. The system of claim 2,
   wherein the double ball joint is configured by pivotally fitting a second hinge shaft on a first hinge shaft connected between the sliders,
   wherein the one end of the pushrod and the one end of the stabilizer link are coupled to the second hinge shaft in a ball joint type.

4. The system of claim 3, wherein the double ball joint includes:
   the first hinge shaft having a first spherical ball formed on an outer circumference in a middle portion of the first hinge shaft;
   the second hinge shaft having cylindrical members and including a first ball race mounted on an inner surface of the second hinge shaft, wherein the first ball race is slidably fitted on an outer circumference of the first spherical ball;
   a second spherical ball coupled to an outer circumference in a middle portion of the second hinge shaft; and
   a second ball race fitting on an outer surface of the second spherical ball.

5. The system of claim 4, wherein the second ball race is integrally formed to the one end of the stabilizer link.

6. The system of claim 4, wherein the second hinge shaft is formed by fitting a pair of cylindrical members together.

7. The system of claim 4, wherein each of the cylindrical members has a circumferential step protruding toward the first hinge shaft and the first ball race is mounted between each circumstantial step on an inner circumference of the cylindrical members.

8. The system of claim 4, wherein the second spherical ball is supported by yokes formed the one end of the pushrod, the yokes being positioned at both lateral sides of the second spherical ball.

9. The system of claim 1, wherein the pushrod and the operation bar are connected in the ball joint by combining a ball, which is formed on an outer circumference in the center of a hinge shaft fixed to yokes formed at the other end of the pushrod, with a ball race mounted on the ball between the one end of the operation bar and the other end of the push rod.

* * * * *